INVENTOR.
Richard D. Jones

United States Patent Office 3,091,252
Patented May 28, 1963

3,091,252
LIQUID TRANSFERRING APPARATUS
Richard De Forest Jones, P.O. Box 113, Kent, Conn.
Filed Aug. 22, 1961, Ser. No. 133,232
9 Claims. (Cl. 137—392)

The present invention relates to an apparatus for transferring liquid from one location to another and more particularly to such an apparatus that has a chamber in which reduced pressure causes liquid to flow thereinto and in which an elimination of the reduced pressure causes the fluid to flow therefrom.

The apparatus of the present invention has specific utility when employed for transferring liquids in which it is required to clean the apparatus after substantially each usage. This is particularly true where apparatus is employed for transferring liquid milk from the location where it is obtained, such as the milking machine, to a storage area, such as a bulk cooler. While liquid transferring devices have heretofore been proposed to effect the transferral, these devices have not been found sufficiently satisfactory in use for numerous reasons. The primary reason appears to be that such devices have been difficult and time consuming to clean after each use, as is generally required by health statutes and in addition, the flow of the liquid into and out of the chamber agitates and splashes the liquid, which in the case of liquid milk may cause breakdown of the proteins and butterfat globules.

It is accordingly an object of the present invention to provide an apparatus for transferring liquid in which the apparatus may be easily and quickly cleaned without disassembly after usage.

Another object of the present invention is to provide such an apparatus in which the flow of liquid therein is controlled to prevent splashing and undue agitation of the liquid.

A further object of the present invention is to provide such an apparatus that achieves the above objects and which is simple in construction, reliable in operation and relatively economical to manufacture.

In carrying out the present invention there is provided in the specific embodiment shown hereafter a chamber having a substantially spherical shape. The chamber is alternately placed under reduced pressure, such as a vacuum and returned to normal pressure such as atmosphere by a communicating passageway connectible to either a source of vacuum or the atmosphere. Inlet and outlet passageways communicate with the chamber and particularly the inlet passageway is formed to direct incoming liquid tangentially to the sides of the chamber in the upper portion, to prevent undue agitation and have a minimum of splashing.

The pressure controls the liquid level between a lower level and an upper level with the upper level being substantially aligned with the inlet passageway. However, when it is desired to clean the apparatus, the inlet is connected to a source of cleaning liquid and the upper liquid level is raised until it is substantially at the top of the chamber, thereby enabling the cleaning liquid to fill the chamber and effect total cleaning thereof by merely transferring, in its normal manner, the cleaning solution from the inlet to the outlet.

Other features and advantages will hereinafter appear.

Figure 1:
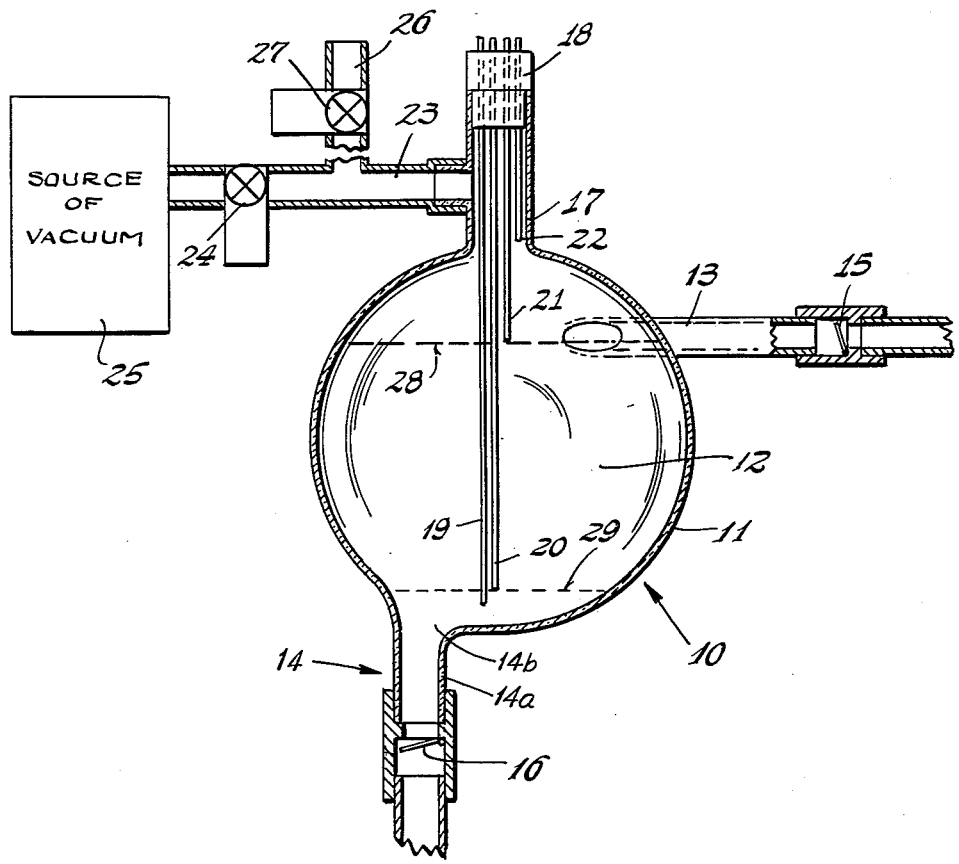
FIGURE 1 is an elevation of the liquid transferring apparatus of the present invention shown partly in section.
Figure 2:
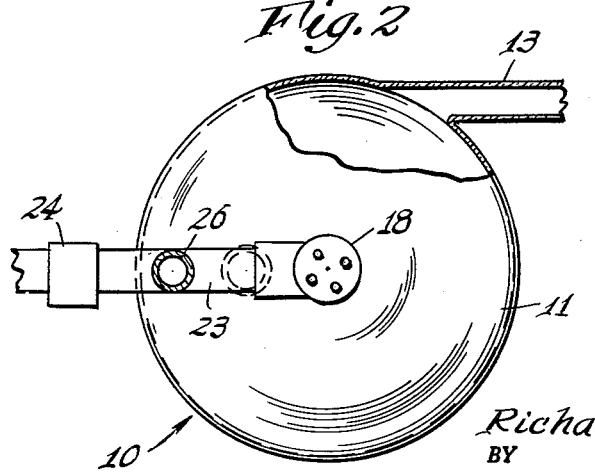
FIG. 2 is a plan with portions broken away to show underlying structure.

Referring to the drawing, the fluid transferring apparatus of the present invention is generally indicated by the reference numeral 10 and includes a hollow glass sphere 11, of substantial size, that forms a substantially spherical chamber 12. Though a spherical chamber is specifically disclosed, other shapes may be employed, if desired. Communicating with the upper portion of the chamber 12 is a fluid inlet 13 which is horizontally tangential to the interior of the chamber. An outlet 14 in the lower portion thereof provides a passageway for the outgoing liquid and it will be appreciated that the outlet 14 includes a radially extending conduit 14a having an entrance 14b that is offset from the center of the spherical chamber 12. Both the inlet 13 and the outlet 14 each have a one-way valve 15 and 16 respectively, shown as a flapper valve to prevent reverse flow of liquid.

The chamber includes a vertical passageway 17 extending radially upwardly from the substantially spherical chamber 12 and is provided with a stopper 18 which releasably closes an entrance to the passageway. The stopper further mounts electrically insulated from each other, a plurality of electrodes 19, 20, 21 and 22 that extend down into the chamber 12. The electrodes 19 and 20 extend substantially to the bottom of the chamber while the electrode 21 terminates substantially in alignment with the outlet 13 and the electrode 22 terminates substantially at the entrance to the passageway 17 for reasons which will hereinafter be apparent.

Communicating with the passageway 17 is conduit 23 which through a normally closed solenoid valve 24 communicates with a source of vacuum 25. Also communicating with the conduit 23 is an atmospheric opening 26 with another normally closed solenoid valve 27 controlling the introduction of atmospheric pressure (though any other pressure greater than that obtained by the vacuum may be employed) into the conduit 23 and the chamber 12.

The apparatus functions to provide a vacuum within the chamber which causes fluid to be "sucked" into the chamber 12 through the inlet 13 until the liquid in the chamber reaches an upper liquid level, as indicated by the dotted line 28 (FIG. 1), at which time the vacuum is destroyed and atmospheric pressure is introduced into the chamber to permit the fluid therein to flow by gravity out the outlet 14. When the liquid level is at the lower liquid level indicated by the dotted line 29 (FIG. 1), a vacuum is again placed in the chamber, the atmospheric pressure reduced and liquid flows into the chamber to repeat the cycle. Valves 15 and 16 prevent reverse flow in the inlet and outlet.

The electrodes 19 through 22 inclusive control the operation of the valves 24 and 27 and hence the pressure within the chamber, with the electrode 20 being spaced approximately level with the outlet opening 14 to control the lower liquid level while the electrode 21 controls the upper liquid level. The electrode 19 is common and the electrodes function by using the liquid as an electrical conductor and hence the liquid level indicated by the dotted line 28 must be achieved prior to conduction between the electrode 19 and the electrode 21 while the liquid level must be below the dotted line 29 before conduction is stopped between the electrode 19 and electrode 20.

In use when the liquid transferring apparatus is used to transfer milk, the liquid level alternates between the level heights approximately indicated by the dotted lines 28 and 29 as heretofore explained. After being used in this manner the apparatus may be easily cleaned according to the present invention by the introduction through the inlet 13 of a cleaning solution which thoroughly cleans the interior of the chamber. To clean the portions of the chamber above the liquid level 28, the present invention employs the electrode 22 which as shown terminates in the passageway 17. Accordingly by changing the upper level control height from that determined by the electrode 21 to that determined by the electrode 22, the present invention provides for the cleaning fluid filling the entire chamber. Moreover, it will be appreciated that the outlet means by being tangential to the side of the chamber provides a swirling action of the cleaning fluid which has been found advantageous in effecting the cleaning of the chamber. While the passageway 17 is not filled with cleaning solution very little, if any, previous liquid, such as milk, is therein by reason of the tangential direction of the incoming liquid, but even so by the use of a higher liquid level height of the cleaning solution enables the passageway to be also cleaned since the higher liquid level terminates approximately therein. In addition if desired to completely clean the passageway, the stopper 18 in which the electrodes are mounted may be removed to thereby provide access to the interior of the passageway.

Figure 3:
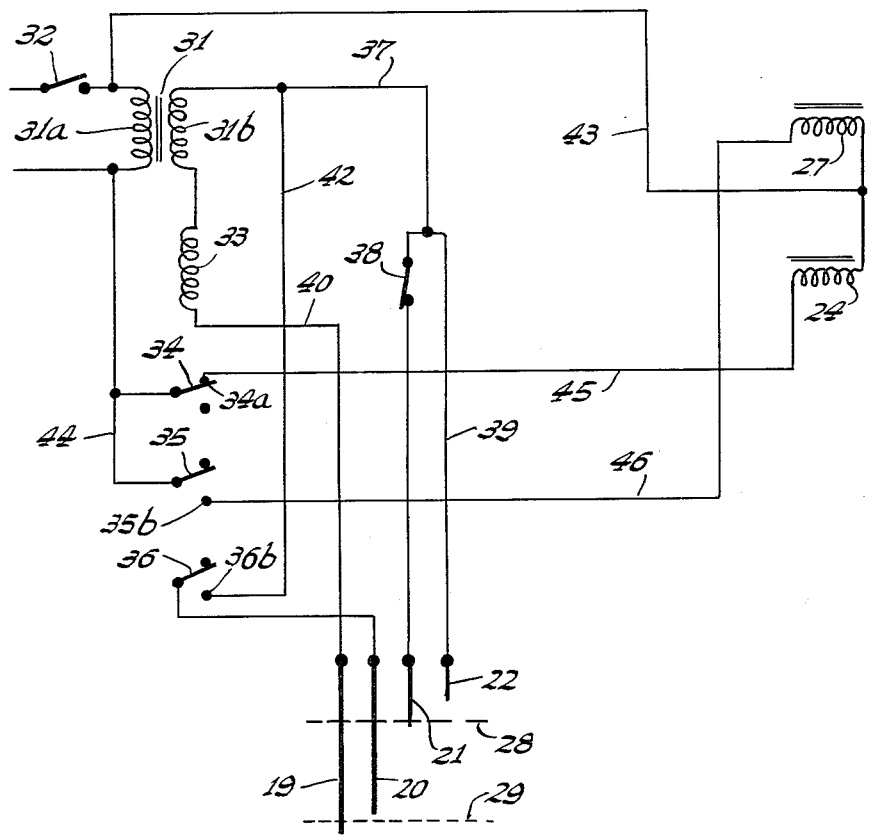
FIG. 3 is an electrical schematical diagram of the interconnection of the electrical elements of the present invention.

Referring to FIG. 3, the electrical schematic diagram, the electrodes are given the same reference numbers as are the normally closed valves 24 and 27. There is provided a step-down transformer 31 having a primary 31a connectible to a source of alternating current and including an on-off switch 32. The secondary 31b of the transformer is connected to the coil of a relay 33 having actuatable switch arms 34, 35 and 36 shown in the solid line position in their normal or relay unenergized position. The relay through a lead 37 having a switch 38 is connected to the electrode 21, while a lead 39 is connected to the electrode 22 and to the lead 37 after the switch 38. The common electrode 19 is connected to the relay 33 by a lead 40, while the electrode 20 by a lead 41 is connected to the switch arm 36 of the relay 33 with a lead 42 connecting lead 37 to switch contact 36b. The two solenoid valves 24 and 27 have a common lead 43 connected to one side of the input and the other side is connected by a lead 44 to the switch arms 34 and 35. Solenoid valve 24 is connected to contact 34a by lead 45, while solenoid valve 27 by a lead 46 is connected to the contact 35b.

In operation of the liquid transferring apparatus of the present invention upon closure of the switch 32 with the switch 38 being closed and presuming that the liquid level is below the level 29, the suction solenoid valve 24 is energized to its open position and the air valve 27 unenergized and maintained closed by a circuit which includes the elements 34, 34a, 45, 24 and 43. The relay 33 is not energized. As the liquid level rises to the upper level line 28 then a circuit is established which deenergizes to close solenoid valve 24 and energizes to open solenoid valve 27. This circuit includes the elements 31b, 33, 40, 19, 21, 38 and 37. The solenoid valve 27 is maintained energized as the liquid level decreases to the lower level 29 by a holding circuit which includes the elements 31b, 33, 40, 19, 20, 41, 36, 36b, 42 and 37. Upon the liquid reaching the level 29 the conduction between the electrode 19 and 20 ceases deenergizing the relay 33 to return the switch arms to their normal positions which energizes to open solenoid valve 24 and maintains closed solenoid valve 27.

In carrying out the present invention when it is desired to wash the transfer unit the inlet 13 and outlet 14 are connected to a reservoir of cleaning liquid. The upper liquid level is changed to the higher liquid level by the switch 38 being opened which in effect substitutes the high liquid level electrode 22 for the electrode 21. The above sequence of operation is repeated as many times as necessary to enable the liquid level of the cleaning liquid to be raised and lowered.

It will be appreciated that upon opening of the on-off switch 32 that both the solenoid valve 24 and the air valve 27 by being of the normally closed type are maintained closed and hence prevent the entrance of contaminants into the liquid transfer apparatus.

It will accordingly be appreciated that there has been disclosed a liquid transferring apparatus which effects transferring liquid with a minimum of agitation and splashing. After the transfer of the desired liquid, the apparatus may be easily cleaned by simply introducing cleaning solution into the chamber and for raising the normal upper liquid level to a higher level until it effects substantial filling of the chamber with cleaning solution. The apparatus is then operated in the same manner as if it were transferring the desired liquid. The cleaning is aided by the manner in which the incoming liquid is tangentially directed to provide a swirling action which also aids in the minimizing of splashing and agitation when the desired liquid such as milk is being transferred.

Variations and modifications may be made within the scope of the claims and portions of the improvements may be used without others.

I claim:

1. A liquid milk transferring system comprising means forming a chamber, inlet and outlet means communicating with said chamber, means for controlling the flow of liquid milk into and out of said chamber to maintain a lower liquid milk level and an upper liquid milk level in said chamber and additional means for setting a higher upper liquid level in said chamber for whenever a cleaning liquid is being flowed into and out of said chamber.

2. A liquid milk transferring system comprising means forming a chamber, inlet and outlet means communicating with said chamber, means for controlling the flow of liquid milk into and out of said chamber to maintain a lower liquid milk level and an upper liquid milk level in said chamber, additional means for setting a higher upper liquid level in said chamber for whenever a cleaning liquid is being flowed into and out of said chamber, said means for controlling including an element extending into the lower part of said chamber for determining the lower liquid milk level and another element extending into the upper part of said chamber for determining the upper liquid milk level and the additional means includes a third element extending into a higher part of the chamber than the another element for determining the upper level of the cleaning liquid.

3. A liquid milk transferring system comprising means forming a chamber, inlet and outlet means communicating with said chamber, means for controlling the flow of liquid milk into and out of said chamber to maintain a lower liquid milk level and an upper liquid milk level in said chamber, additional means for setting a higher upper liquid level in said chamber for whenever a cleaning liquid is being flowed into and out of said chamber, said means including electrically actuated means for applying a reduced pressure in the chamber for increasing the height of the liquid milk from the lower level to the upper level and for eliminating the reduced pressure when the liquid milk level is at the upper liquid milk level and further including a lower level electrode terminating in the lower part of the chamber and another electrode for the upper milk level terminating in the upper part of the chamber, said additional means including a third electrode terminating higher in the upper part than the another electrode, and switch means for connecting either the another electrode or the third electrode to the controlling means.

4. A liquid transferring system comprising means forming a substantially spherical chamber, outlet means communicating with the lower portion of the chamber, said outlet means including a vertically extending conduit having an entrance at the bottom portion of the chamber that is offset from the center of the chamber, inlet means communicating with the upper portion of the chamber and including a horizontally extending conduit means having an opening horizontally tangential to the inner surface of the spherical chamber for directing the inflowing liquid substantially horizontally tangentially to the inside of the chamber to avoid splashing and provide a circular motion to the inflowing liquid, means for controlling the inflow and outflow of the liquid to maintain the liquid level between a lower level and an upper level, and in which the upper level is no higher than the horizontally tangential opening.

5. The invention as defined in claim 4 in which the chamber includes a passageway extending upwardly from the top portion and the means for controlling the flow includes the alternate applying of a pressure and a reduced pressure through the passageway.

6. A liquid transferring system comprising means forming a substantially spherical chamber, outlet means communicating with the lower portion of the chamber, inlet means communicating with the upper portion of the chamber and including a horizontally extending conduit means having an opening horizontally tangential to the inner surface of the spherical chamber for directing the inflowing liquid substantially horizontally tangentially to the inside of the chamber to avoid splashing and provide a circular motion to the inflowing liquid and means for controlling the inflow and outflow of the liquid to maintain the liquid level between a lower level and an upper level and additional means for setting a higher upper liquid level in said chamber when desired to introduce cleaning liquid in the chamber.

7. A liquid transferring system comprising means forming a substantially spherical chamber including a passageway extending upwardly from the top portion, outlet means communicating with the lower portion of the chamber, inlet means communicating with the upper portion of the chamber for directing the inflowing liquid substantially tangentially to the inside of the chamber to avoid splashing and provide a circular motion to the inflowing liquid, means for controlling the inflow and outflow of the liquid to maintain the liquid level between a lower level and an upper level by alternately applying a pressure and a reduced pressure through the passageway, and additional means for setting a higher upper liquid level in said chamber when desired to introduce cleaning liquid in the chamber, said higher liquid level being substantially at the entrance to the passageway and the upper liquid level being substantially aligned with inlet means.

8. A liquid transferring system comprising means forming a substantially spherical chamber including a passageway extending upwardly from the top portion, outlet means communicating with the lower portion of the chamber, inlet means communicating with the upper portion of the chamber for directing the inflowing liquid substantially tangentially to the inside of the chamber to avoid splashing and provide a circular motion to the inflowing liquid, electrically actuated means for controlling the inflow and outflow of the liquid to maintain the liquid level between a lower level and an upper level, additional means for setting a higher upper liquid level in said chamber when desired to introduce cleaning liquid in the chamber, said controlling means including a lower level electrode and an upper level electrode and the additional means including a higher upper level electrode with the electrodes being mounted to extend into the chamber through the passageway.

9. The invention as defined in claim 8 in which the electrodes are mounted in a stopper that is removably mounted in an entrance to the passageway.

References Cited in the file of this patent

UNITED STATES PATENTS

| | | |
|---|---|---|
| 1,962,192 | Hapgood | June 12, 1934 |
| 1,972,144 | Hapgood | Sept. 4, 1934 |
| 2,135,582 | Kohler | Nov. 8, 1938 |
| 2,773,720 | Palm et al. | Dec. 11, 1956 |
| 2,853,050 | Golay | Sept. 23, 1958 |
| 2,871,821 | Golay | Feb. 3, 1959 |